Patented May 24, 1938

2,118,661

UNITED STATES PATENT OFFICE 2,118,661

AZO DYES AND PROCESS FOR MANUFACTURING THE SAME

Erich Baumann, Dessau-Ziebigk, Germany, assignor to General Aniline Works, Inc., New York, N. Y., a corporation of Delaware No Drawing. Application March 12, 1936, Serial No. 68,451. Renewed October 22, 1937. In Germany March 13, 1935

5 Claims. (Cl. 260—96)

My present invention relates to the manufacture of azo dyes which are applicable for dyeing cellulose esters, especially acetate silk, by coupling a diazo compound from an amino compound of the general formula

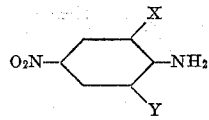

in which X and Y represent hydrogen or halogen, with a di-(hydroxyalkyl)-aniline which contains halogen in the 3-position.

Further objects of my invention are the new dyes obtainable according to this process.

The new dyes have good capacity for white discharge and good fastness to washing and water, and also very good fastness to light.

The following examples illustrate the invention, the parts being by weight:—

*Example 1.*—A diazo solution prepared in the usual manner from 13.8 parts of 4-nitro-1-aminobenzene is caused to flow into a cold solution of 21.6 parts of 3-chloro-1-di-(hydroxy-ethyl)-aminobenzene in 25 parts of hydrochloric acid of 23° Bé. and 800 parts of water. The reaction is buffered by means of sodium acetate until the end of the coupling. The dye thus obtained yields on acetate silk a fiery, clear scarlet of very good fastness to light.

If, instead of the 3-chloro-1-di-(hydroxy-ethyl)-aminobenzene the 3-bromo-1-di-(hydroxy-ethyl)-aminobenzene is used, there is obtained a dye which also dyes acetate silk clear fast scarlet tints.

*Example 2.*—A diazo solution from 17.3 parts of 4-nitro-2-chloro-1-aminobenezene, obtained in the usual manner, is caused to flow into a cold solution of 21.6 parts of 3-chloro-1-di-(hydroxy-ethyl)-aminobenzene in 25 parts of hydrochloric acid of 23° Bé. and 800 parts of water, and the reaction is buffered with sodium acetate until coupling is complete. The precipitated dye yields on acetate silk bluish-red tints of good general fastness and excellent fastness to light.

By using 3-bromo-1-di-(hydroxy-ethyl)-aminobenzene instead of the 3-chloro-1-di-(hydroxy-ethyl)-aminobenzene there is obtained a dye which also dyes acetate silk fast red tints.

*Example 3.*—A diazo solution made in the usual manner from 21.7 parts of 4-nitro-2-bromo-1-aminobenzene is introduced into a cold solution of 21.6 parts of 3-chloro-1-di-(hydroxy-ethyl)-aminobenzene in 25 parts of hydrochloric acid of 23° Bé. and 800 parts of water. The dye precipitated by means of sodium acetate after complete coupling, dyes acetate silk fast blue red tints. By using 26 parts of 3-bromo-1-di-(hydroxyethyl)-aminobenzene there is obtained a dye which dyes acetate silk similar tints.

*Example 4.*—A diazo solution is prepared by stirring at 25 to 30° C. 20.7 parts of 2,6-dichloro-1-amino-4-nitrobenzene into nitrosyl-sulfuric acid, made by introducing 7 parts of sodium nitrite into 130 parts of concentrated sulfuric acid, and the mass is then diluted by pouring it upon ice. The filtered solution of the diazo compound in sulfuric acid is run into a cold solution of 21.6 parts of 3-chloro-1-di-(hydroxy-ethyl)-aminobenzene in 25 parts of hydrochloric acid of 23° Bé. and 1000 parts of water. The mixture is thereupon buffered with sufficient sodium hydroxide until the coupling is at an end. The dye dyes acetate silk full yellow-brown tints fast to light.

If 3-bromo-1-di-(hydroxy-ethyl)-aminobenzene be substituted for the 3-chloro-1-di-(hydroxy-ethyl)-amino benzene a dye is obtained which dyes acetate silk similar but somewhat more yellow tints.

*Example 5.*—A diazo solution prepared by introducing 29.6 parts of 2,6-dibromo-1-amino-4-nitro-benzene into 130 parts of concentrated sulfuric acid and 7 parts of sodium nitrite at 25 to 30° C. and pouring the mass upon ice is introduced into a solution of 21.6 parts of 3-chloro-1-di-(hydroxy-ethyl)-aminobenzene in 25 parts of hydrochloric acid of 23° Bé. and 1000 parts of water and, at the end of the coupling, the mixture is buffered with sodium hydroxide. The dye dyes acetate silk fast yellow-brown tints.

By using 26 parts of 3-bromo-1-di(hydroxyethyl) aminobenzene there is obtained a dye which dyes acetate silk similar tints.

What I claim is:—

1. The dyes which correspond to the general formula

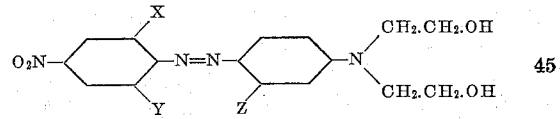

wherein X and Y is an element selected from the group consisting of hydrogen and halogen, and Z is a halogen of the group consisting of chlorine and bromine, said dyes dyeing acetate silk clear red to yellow-brown tints of good fastness to washing and water and of a very good fastness to light, the dyeings having a good capacity for white discharge.

2. The dyes which correspond to the formula

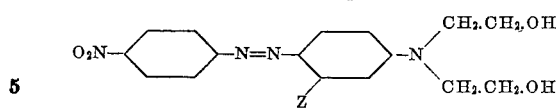

where Z is a halogen of the group consisting of chlorine and bromine, said dyes dyeing acetate silk a fiery, clear scarlet of very good fastness to light.

3. The dyes which correspond to the formula

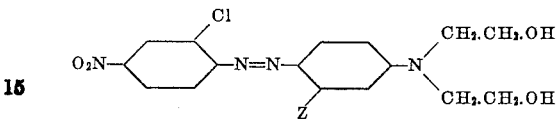

wherein Z means a halogen of the group consisting of chlorine and bromine, said dyes dyeing acetate silk bluish-red tints of good general fastness and excellent fastness to light.

4. The dyes which correspond to the general formula

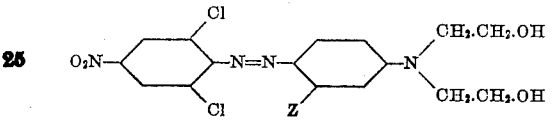

wherein Z is a halogen selected from the group consisting of chlorine and bromine, said dyes dyeing acetate silk full yellow-brown tints fast to light.

5. The process which comprises diazotizing an amine of the general formula

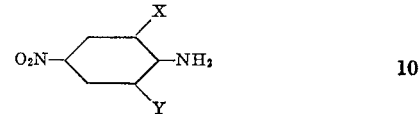

wherein X and Y stand for an element selected from the group consisting of hydrogen and halogen, and coupling the diazo compound with an amine of the general formula

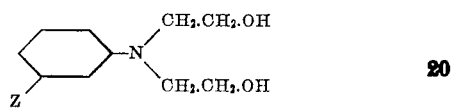

wherein Z is a halongen selected from the group consisting of chlorine and bromine.

ERICH BAUMANN.